United States Patent
Lee et al.

(10) Patent No.: US 11,449,074 B2
(45) Date of Patent: Sep. 20, 2022

(54) ROBOT FOR PROVIDING GUIDANCE SERVICE USING ARTIFICIAL INTELLIGENCE AND METHOD OF OPERATING THE SAME

(71) Applicant: LG Electronics Inc., Seoul (KR)

(72) Inventors: Inho Lee, Seoul (KR); Junmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 413 days.

(21) Appl. No.: 16/605,462

(22) PCT Filed: Jun. 18, 2019

(86) PCT No.: PCT/KR2019/007318
§ 371 (c)(1),
(2) Date: Oct. 15, 2019

(87) PCT Pub. No.: WO2020/256169
PCT Pub. Date: Dec. 24, 2020

(65) Prior Publication Data
US 2021/0373574 A1    Dec. 2, 2021

(51) Int. Cl.
| G05D 1/00 | (2006.01) |
| G05D 1/02 | (2020.01) |
| H04W 4/024 | (2018.01) |
| G05B 13/02 | (2006.01) |
| G06K 9/62 | (2022.01) |
| G06V 20/20 | (2022.01) |

(52) U.S. Cl.
CPC ......... *G05D 1/0287* (2013.01); *G05B 13/027* (2013.01); *G06K 9/6257* (2013.01); *G06V 20/20* (2022.01); *H04W 4/024* (2018.02)

(58) Field of Classification Search
CPC ..... G05D 1/0287; H04W 4/024; G06V 20/20; G05B 13/027; G06K 9/6257
USPC ......................................................... 700/248
See application file for complete search history.

(56) References Cited

U.S. PATENT DOCUMENTS

| 2006/0079997 A1 * | 4/2006 | McLurkin ............ G05D 1/0297 700/245 |
| 2018/0279847 A1 | 10/2018 | Park et al. |
| 2020/0103921 A1 * | 4/2020 | Voorhies ............... G05D 1/0287 |

FOREIGN PATENT DOCUMENTS

| JP | 2006231421 | 9/2006 |
| KR | 20110035258 | 4/2006 |
| KR | 101193950 | 10/2012 |
| KR | 20180031153 | 3/2018 |
| KR | 20180109572 | 10/2018 |

OTHER PUBLICATIONS

International Search Report in International Appln. No. PCT/KR2019/007318, dated Mar. 18, 2020, 17 pages (with English translation).

* cited by examiner

Primary Examiner — Tyler J Lee
Assistant Examiner — Tiffany P Ohman
(74) Attorney, Agent, or Firm — Fish & Richardson P.C.

(57) ABSTRACT

A robot for providing a guidance service using artificial intelligence. The robot measures distances between external robots and the robot and, based on the measured distances, determines that robots are concentrated in a specific area. Based on the determination that robots are concentrated in the specific area, the robot moves some of the external robots to the specific area.

14 Claims, 7 Drawing Sheets

| PRIORITY | AREA |
|---|---|
| 1 | AREA IN WHICH RATIO OF NUMBER OF ROBOTS TO NUMBER OF USERS IS LARGEST |
| 2 | AREA IN WHICH NUMBER OF ROBOTS IS SMALLEST |
| 3 | AREA IN WHICH NUMBER OF ROBOTS IS SMALLEST AND RATIO OF NUMBER OF ROBOTS TO NUMBER OF USERS IS SMALLEST |

| PRIORITY | AREA |
| --- | --- |
| 1 | AREA IN WHICH USER IS LOCATED WHEN INTENTION OF VOICE INFORMATION OF USER INDICATES WAY FINDING |
| 2 | AREA IN WHICH USER IS LOCATED WHEN ACTION OF USER IS ACTION TO VIEW GUIDE BOARD |
| 3 | AREA IN WHICH USER IS LOCATED WHEN ACTION OF USER IS ACTION TO LOOK AROUND |

ROBOT FOR PROVIDING GUIDANCE SERVICE USING ARTIFICIAL INTELLIGENCE AND METHOD OF OPERATING THE SAME

CROSS-REFERENCE TO RELATED APPLICATIONS

This application is a National Stage application under 35 U.S.C. § 371 of International Application No. PCT/KR2019/007318, filed on Jun. 18, 2019. The disclosure of the prior application is incorporated by reference in its entirety.

TECHNICAL FIELD

The present invention relates to a robot and, more particularly, to a robot capable of providing a guidance service using artificial intelligence.

BACKGROUND ART

Recently, with explosive increase in number of passengers who use airports and efforts to leap into smart airports, methods of providing services using robots in airports have been discussed.

When intelligent robots are introduced into airports, it is expected that the robots can perform the unique roles of people which cannot be replaced with conventional computer systems, thereby achieving quantitative and qualitative improvement of the provided services.

One of the most important functions of the robots in places where many people gather, including the airports, is to provide users with information such as guidance information.

However, when robots are concentrated in a specific area while performing their tasks, it may be inconvenient for users to move and a guidance functions cannot be faithfully performed in an area where there is no robot.

DISCLOSURE

Technical Problem

An object of the present invention is to prevent a phenomenon wherein a plurality of robots is concentrated in a specific place.

Another object of the present invention is to distribute robots in various areas and to efficiently provide guidance services.

Another object of the present invention is to move an external robot to an area requiring a guidance service.

Technical Solution

A robot according to an embodiment of the present invention may measure a distance between each of external robots and the robot and move some external robots to an area in which robots are concentrated upon determining that robots are concentrated in a specific area, based on the measured distance.

A robot according to an embodiment of the present invention may move an external robot to an area in which the number of robots is small or the number of users is large.

A robot according to an embodiment of the present invention may acquire situation information and position information of a user and move an external robot to the position when guidance is necessary based on the situation information.

Advantageous Effects

According to the embodiment of the present invention, it is possible to prevent a phenomenon wherein a plurality of robots is concentrated in a specific space and to efficiently perform tasks of the robots.

According to the embodiment of the present invention, it is possible to rapidly provide a guidance service, by detecting a situation in which a guidance service is necessary.

BEST MODE

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

Figure 1:
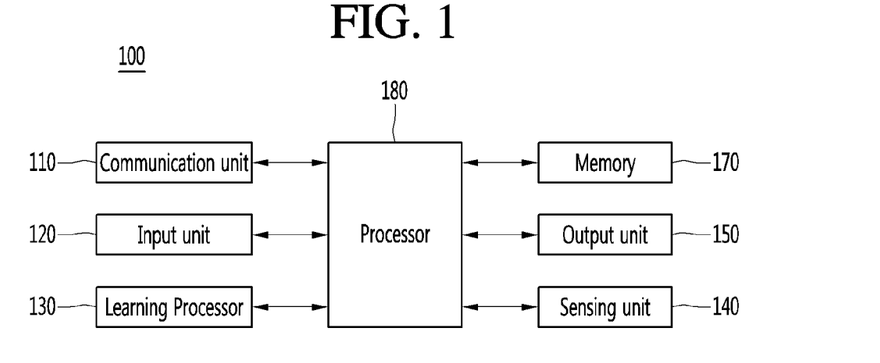
FIG. 1 is a diagram showing an artificial intelligence (AI) device according to an embodiment of the present invention.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
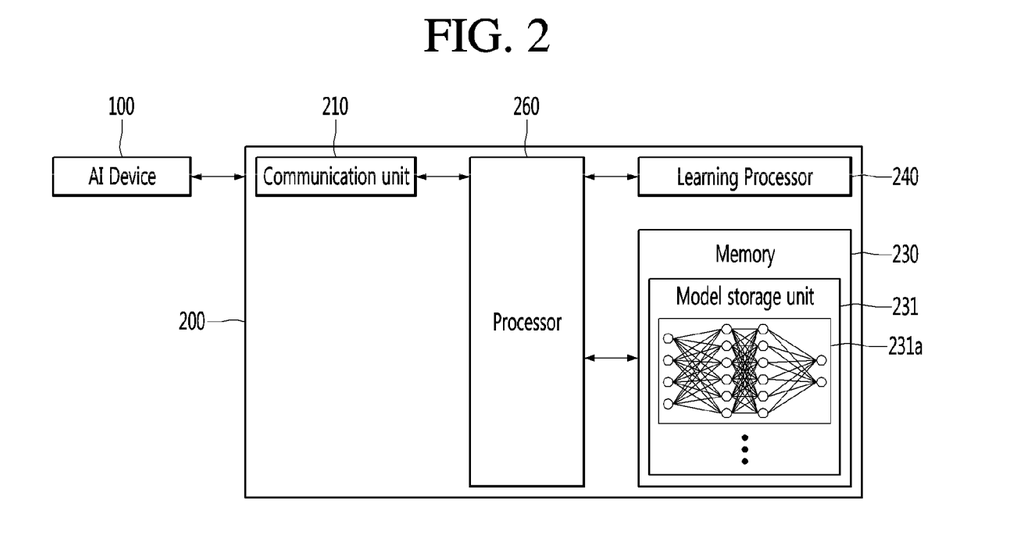
FIG. 2 is a diagram showing an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
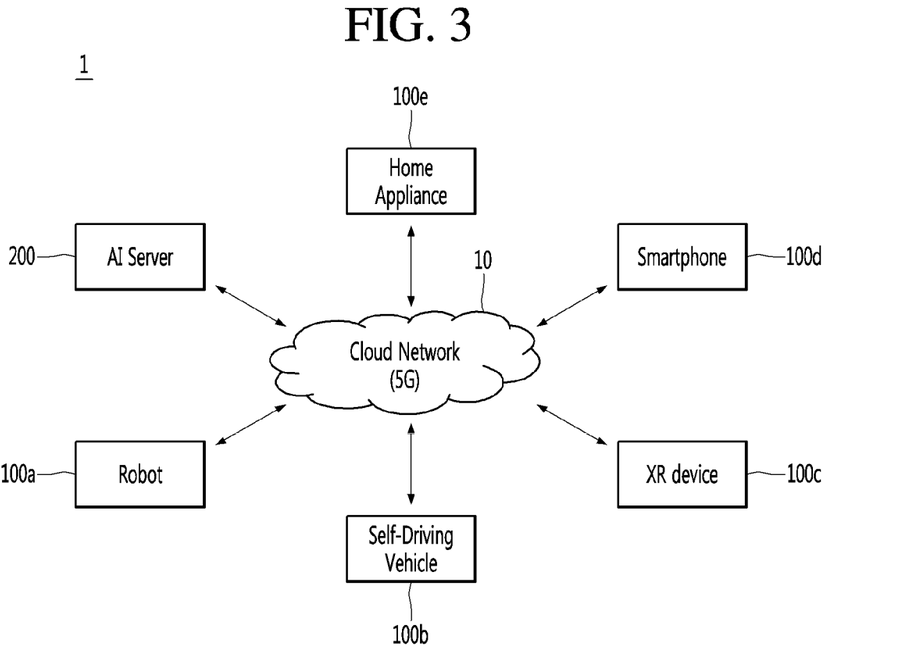
FIG. 3 is a diagram showing an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
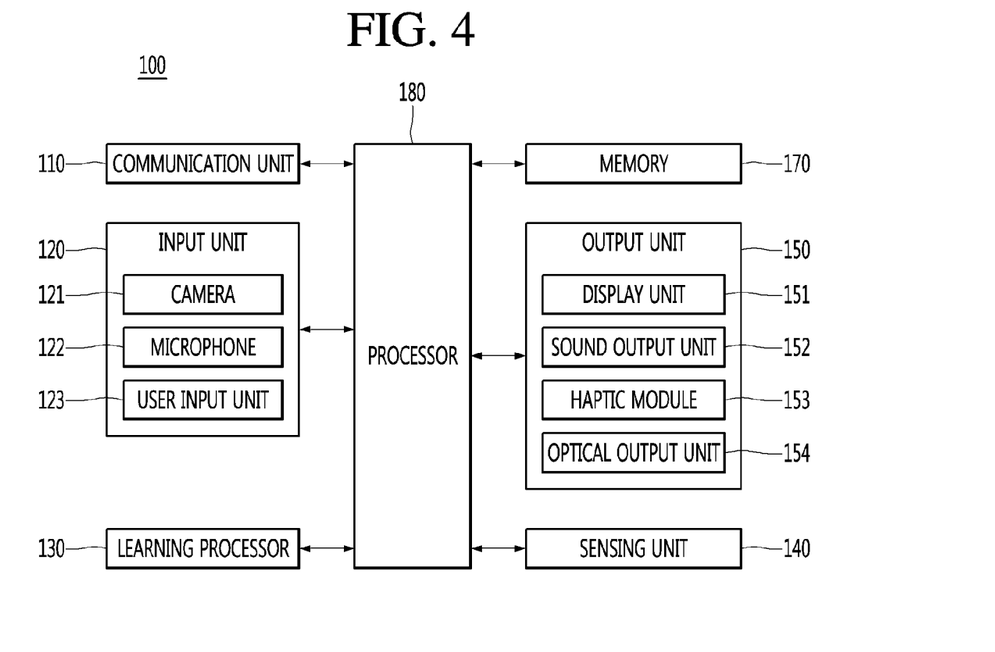
FIG. 4 is a diagram showing an AI device according to another embodiment of the present invention.

FIG. 4 shows an AI device 100 according to an embodiment of the present invention.

A repeated description of FIG. 1 will be omitted.

Referring to FIG. 4, an input unit 120 may include a camera 121 for receiving a video signal, a microphone 122 for receiving an audio signal and a user input unit 123 for receiving information from a user.

Audio data or image data collected by the input unit 120 may be analyzed and processed as a control command of the user.

The input unit 120 receives video information (or signal), audio information (or signal), data or information received from the user, and the AI device 100 may include one or a plurality of cameras 121 for input of the video information.

The camera 121 processes an image frame such as a still image or a moving image obtained by an image sensor in a video call mode or a shooting mode. The processed image frame may be displayed on a display unit 151 or stored in a memory 170.

The microphone 122 processes external acoustic signals into electrical sound data. The processed sound data may be variously utilized according to the function (or the application program) performed in the AI device 100. Meanwhile, various noise removal algorithms for removing noise generated in a process of receiving the external acoustic signal is applicable to the microphone 122.

The user input unit 123 receives information from the user. When information is received through the user input unit 123, a processor 180 may control operation of the AI device 100 in correspondence with the input information.

The user input unit 123 may include a mechanical input element (or a mechanical key, for example, a button located on a front/rear surface or a side surface of the terminal 100, a dome switch, a jog wheel, a jog switch, and the like) and a touch input element. As one example, the touch input element may be a virtual key, a soft key or a visual key, which is displayed on a touchscreen through software processing, or a touch key located at a portion other than the touchscreen.

An output unit 150 may include at least one of a display unit 151, a sound output unit 152, a haptic module 153, and an optical output unit 154.

The display unit 151 displays (outputs) information processed in the AI device 100. For example, the display unit 151 may display execution screen information of an application program executing at the AI device 100 or user interface (UI) and graphical user interface (GUI) information according to the execution screen information.

The display unit 151 may have an inter-layered structure or an integrated structure with a touch sensor so as to implement a touchscreen. The touchscreen may provide an output interface between the terminal 100 and a user, as well as functioning as the user input unit 123 which provides an input interface between the AI device 100 and the user.

The sound output unit 152 may output audio data received from a communication unit 110 or stored in the memory 170 in a call signal reception mode, a call mode, a record mode, a voice recognition mode, a broadcast reception mode, and the like.

The sound output unit 152 may include at least one of a receiver, a speaker, a buzzer or the like.

The haptic module 153 may generate various tactile effects that can be felt by a user. A representative example of tactile effect generated by the haptic module 153 may be vibration.

The optical output unit 154 may output a signal indicating event generation using light of a light source of the AI device 100. Examples of events generated in the AI device 100 may include a message reception, a call signal reception, a missed call, an alarm, a schedule notice, an email reception, an information reception through an application, and the like.

Figure 5:
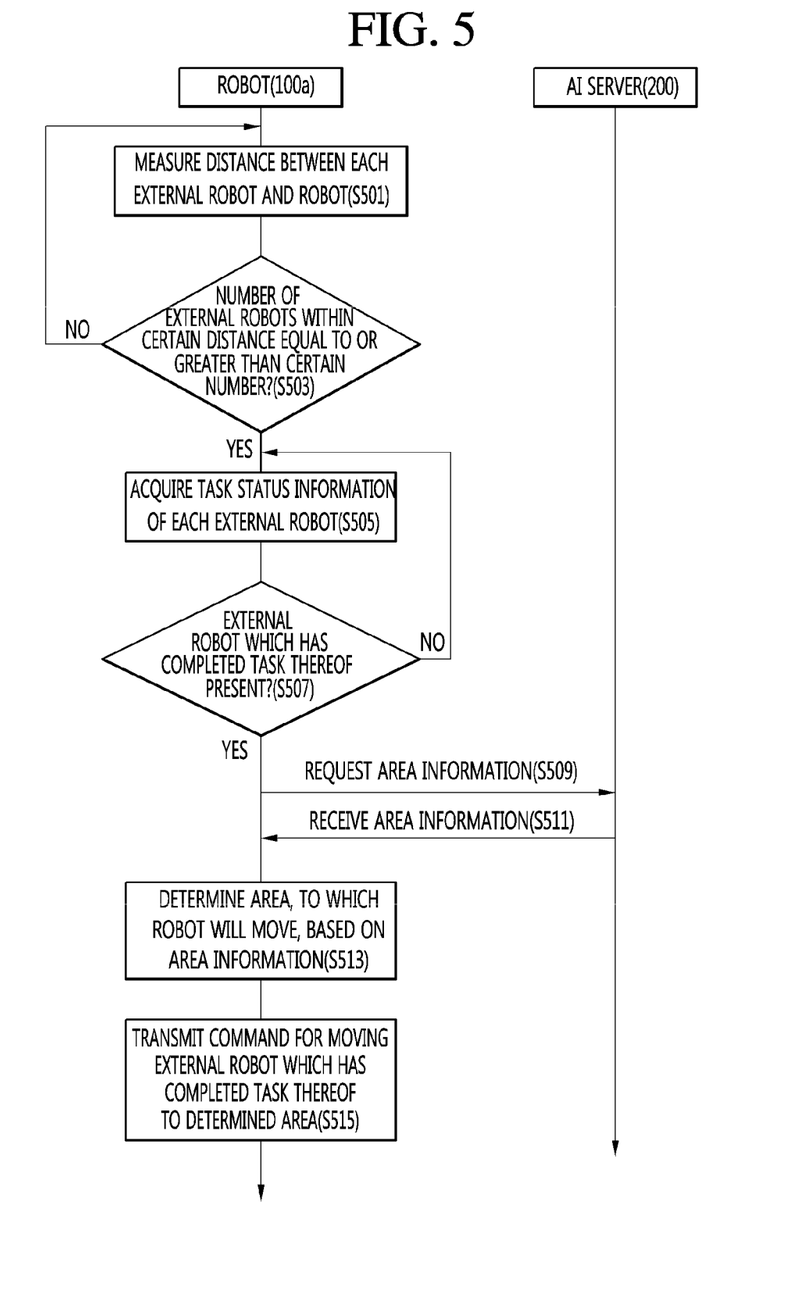
FIG. 5 is a ladder diagram illustrating a method of operating an AI system according to an embodiment of the present invention.

FIG. 5 is a ladder diagram illustrating a method of operating an AI system according to an embodiment of the present invention.

The AI system according to the embodiment of the present invention may include a robot 100a, one or more external robots and an AI server 200.

Each of the robot 100a and the external robots may include the components of FIG. 4.

In particular, FIG. 5 shows movement of some robots to another area when a plurality of robots is concentrated in a specific area.

Referring to FIG. 5, the processor 180 of the robot 100a measures a distances between the robot 100a and each of a plurality of external robots (S501).

In one embodiment, the processor 180 may measure the distance between the robot 100a and each external robot based on a time required to receive a response signal in response to a transmitted signal. To this end, each robot may include a distance sensor (not shown).

Each of the transmitted signals and the response signal may be inserted into a non-audible frequency band.

The distance sensor of the robot 100a may transmit the transmitted signal, receive the response signal in response to the transmitted signal, and calculate a distance between a point in time when the transmitted signal is transmitted and a point in time when the response signal is received.

The processor 180 may measure the robot 100a and each external robot based on a known signal speed and the difference.

In another example, the processor 180 may measure the robot 100a and each external robot using a global positioning system (GPS) module (not shown).

The GPS module of the robot 100a may acquire first position coordinates of the robot 100a and the GPS module of each external robot may acquire second position coordinates of each external robot.

The robot 100a may receive the second position coordinate from each external robot, calculate a distance between the first position coordinates and the second position coordinates, and measure the distance between the robot 100a and each external robot.

In another example, the processor 180 may measure the distance between the robot 100a and each external robot using image information captured through the camera 121.

The processor 180 may extract an object corresponding to the robot from the image information captured through the camera 121. The processor 180 may acquire the size of the extracted object and calculate a distance corresponding to the acquired size.

To this end, the memory 170 may store a plurality of distances respectively corresponding to a plurality of object sizes.

The processor 180 may acquire a distance matching an object size from the memory 170, as the distance between the robot 100a and each external robot.

The processor 180 of the robot 100a determines whether the number of external robots within a certain distance is equal to or greater than a certain number based on the measured distance (S503).

The processor 180 may determine whether external robots are located within the certain distance from the robot 100a.

The certain distance may be 3 m and the certain number may be 3, but this is merely an example.

This will be described with reference to FIG. 6.

Figure 6:
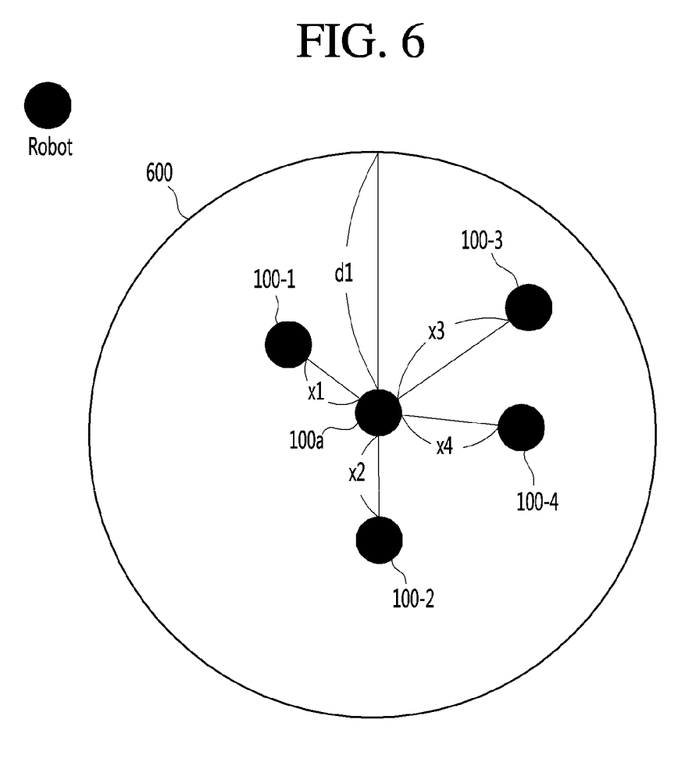
FIG. 6 is a view illustrating an example of detecting an external robot within a certain distance from a robot according to an embodiment of the present invention.

FIG. 6 is a view illustrating an example of detecting an external robot within a certain distance from a robot according to an embodiment of the present invention.

Referring to FIG. 6, the robot 100a may measure distances between external robots 100-1 to 100-4 within a certain distance d1 and the robot 100a.

The robot 100a may acquire a circular area 600 having a radius corresponding to the certain distance d1 and measure the distances between the external robots 100-1 to 100-4 located in the area 600 and the robot 100a.

A method of measuring the distances between the robot 100a and the external robots will be replaced with the description of step S501 of FIG. 5.

The robot 100a may acquire a distance x1 from the first external robot 100-1, a distance x2 from the second external robot 100-2, a distance x3 from the third external robot 100-3, and a distance x4 from the fourth external robot 100-4.

The robot 100a may determine that the number of external robots within the certain distance d1 is 4.

FIG. 5 will be described again.

The processor 180 of the robot 100a acquires task status information of each external robot when the number of external robots within the certain distance is equal to or greater than the certain number (S505).

The processor 180 may request the task status information from each external robot through the communication unit 110 and receive the task status information from each external robot.

To this end, the communication unit 110 may include a short-range communication module (not shown). The short-range communication module may include a module which utilizes a short-range wireless communication standard, such as Wi-Fi or Bluetooth.

The task status information may include whether each external robot is performing a task thereof or has completed a task thereof.

The task status information may further include a degree of task performance. The degree of task performance may be an indicator indicating an extent to which a given task has been performed.

The processor 180 of the robot 100a determines whether an external robot which has completed a task thereof is present based on the acquired task status information (S507).

The processor 180 may determine whether the external robot which has completed the task thereof is present, in order to move, to another area, the external robot which has completed the task thereof.

When the external robot which has completed the task thereof is present, the processor 180 of the robot 100a requests area information from the AI server 200 through the communication unit 110 (S509).

The processor 180 may request the area information from the AI server 200, in order to acquire information for moving the external robot which has completed the task thereof to an area in which the external robot is inactive.

The area information may include the respective positions of a plurality of areas and the number of robots disposed in each area.

The area information may further include a ratio of the number of robots disposed in each area to the number of users. For example, when the number of robots disposed in a specific area is 2 and the number of users is 10, the ratio may be 1:5.

The AI server 200 may divide an entire area in which the plurality of robots is disposed into a plurality of areas and collect the number of robots disposed in each divided area.

The AI server 200 may determine the number of robots disposed in each divided area using images collected from a plurality of cameras disposed in the entire area.

The processor 180 of the robot 100a receives the area information from the AI server 200 (S511).

The processor 180 of the robot 100a determines an area, to which the external robot which has completed the task thereof will move, based on the received area information (S513).

The processor 180 may determine an area, to which one or more external robots has completed the task thereof will move, based on the number of robots disposed in each of the plurality of areas included in the received area information.

For example, the processor 180 may determine, as an area, to which the external robot will move, an area, in which a smallest number of robots is disposed, among a plurality of areas.

This will be described with reference to FIG. 7.

Figure 7:
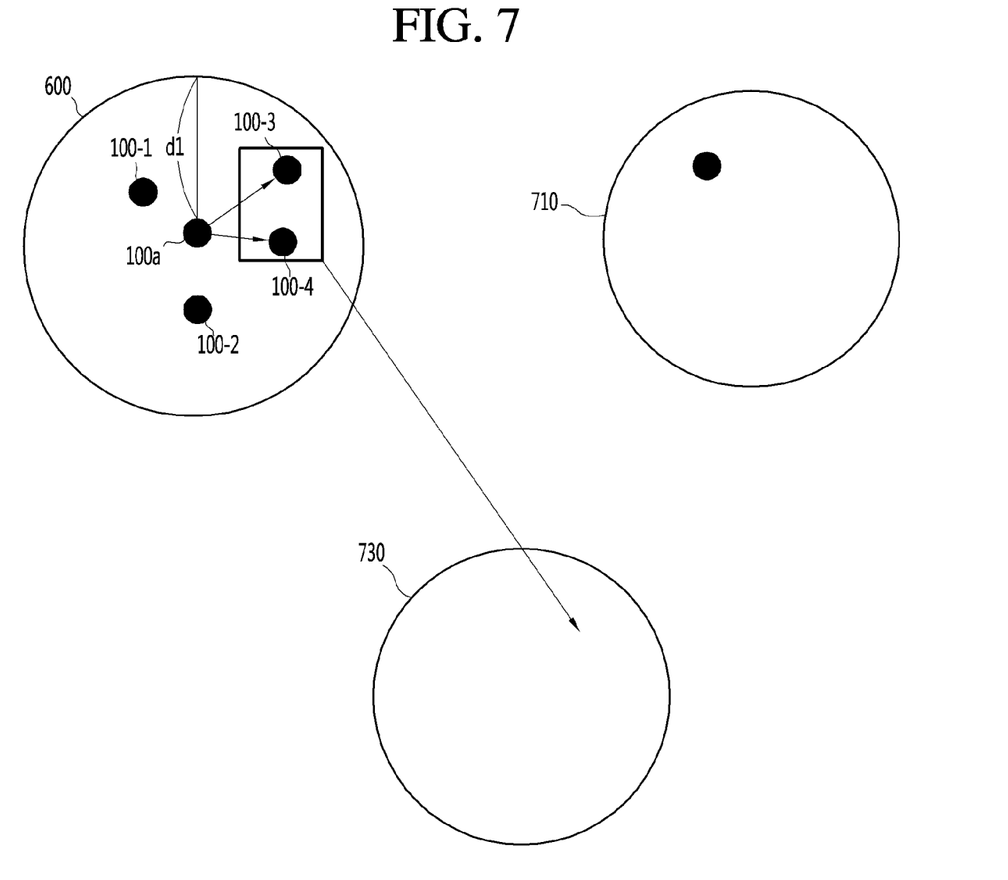
FIG. 7 is a diagram illustrating a process of determining an area, to which an external robot which has completed tasks thereof will move, according to an embodiment of the present invention.

FIG. 7 is a diagram illustrating a process of determining an area, to which an external robot which has completed tasks thereof will move, according to an embodiment of the present invention.

Referring to FIG. 7, the robot 100a may receive the task status information from each of the plurality of external robots 100-1 to 100-4 located within the certain distance d1.

The robot 100a may determine the third and fourth external robots 100-3 and 100-4 which have completed the tasks thereof as objects to be moved, based on the received task status information.

The robot 100a may receive information on a first external area 710 and information on a second external area 730 included in the area information received from the AI server 200.

The robot 100a may check the number of robots disposed in the first external area 710 and the number of robots disposed in the second external area 730.

When the number of robots disposed in the first external area 710 is 0 and the number of robots disposed in the second external area 730 is 1, the robot 100a may determine the second external area 730 as an area, to which the third external robot 100-3 and the fourth external robot 100-4 will move.

FIG. 5 will be described again.

In another example, the processor 180 may determine an area, in which a ratio of the number of robots to the number of users is largest, among the plurality of areas, as an area, to which the external robots will move. In this case, even if many robots are disposed in the corresponding area, robots need to be further disposed in order to help users.

In another example, the processor 180 may give priority to each of the plurality of areas and determine an area, to which the external robots will move.

The processor 180 may determine an area having highest priority among the plurality of areas, as an area, to which the external robot will move.

This will be described with reference to FIG. 8.

Figure 8:
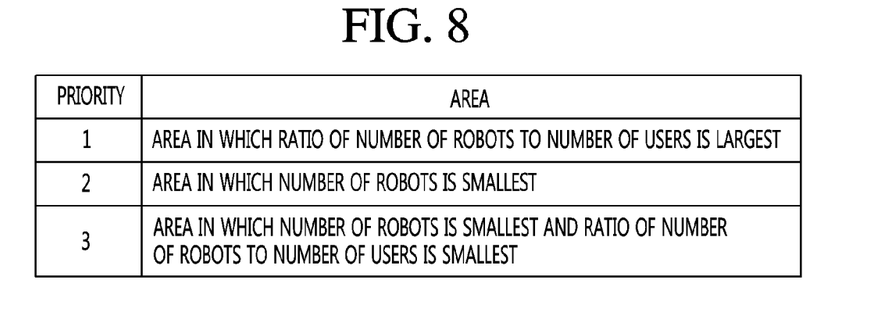
FIG. 8 is a view illustrating priorities given to a plurality of areas according to an embodiment of the present invention.

FIG. 8 is a view illustrating priorities given to a plurality of areas according to an embodiment of the present invention.

Referring to FIG. 8, an area in which a ratio of the number of robots to the number of users is largest may have first priority.

An area in which the number of robots is smallest may have second priority.

An area in which the number of robots is smallest and the ratio of the number of robots to the number of users is smallest may have third priority.

The processor 180 may give priority to each of the plurality of areas based on the area information received from the AI server 200.

The processor 180 may determine an area having highest priority to an area, to which the external robots will move, according to the result of giving priority.

FIG. 5 will be described again.

The processor 180 of the robot 100a transmits, to the external robot which has completed the task thereof, a command for moving the external robot to the determined area through the communication unit 110 (S515).

For example, the processor 180 may transmit, to the third external robot 100-3 and the fourth external robot 100-4 shown in FIG. 7, a command for requesting movement to the second external area 730 through the communication unit 110.

According to the embodiment of the present invention, when robots are concentrated in a specific place, it is possible to prevent from the robots from being concentrated, by moving some robots to another place.

Therefore, the robot can efficiently provide guidance to users.

Figure 9:
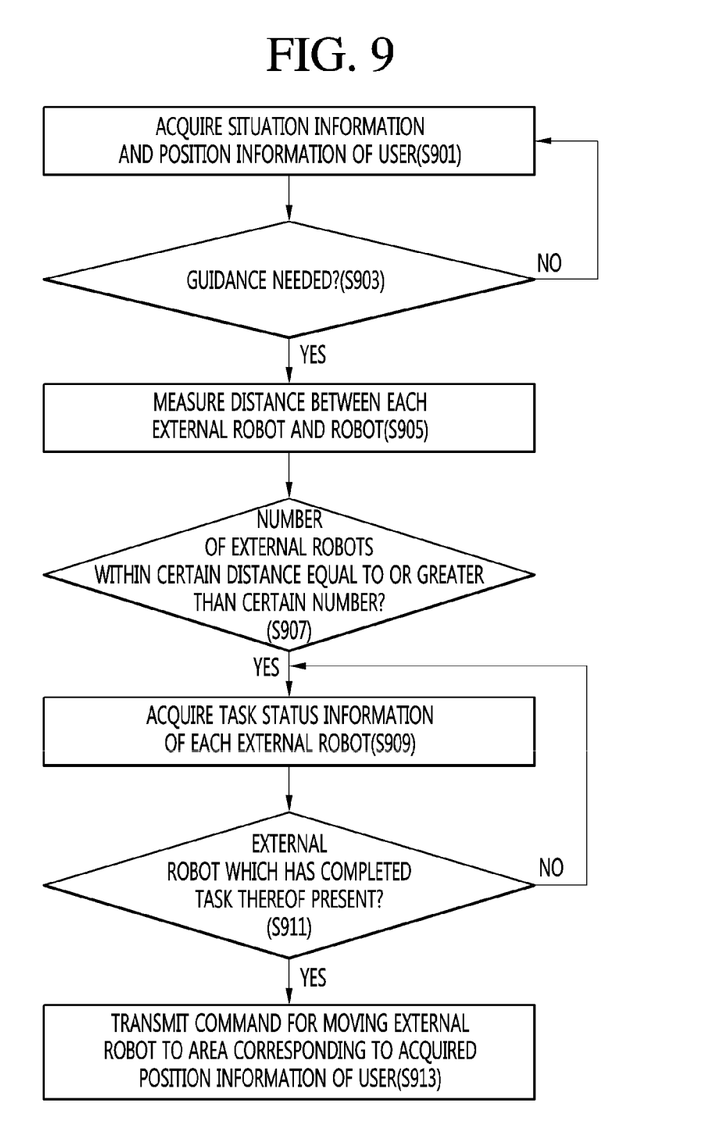
FIG. 9 is a ladder diagram illustrating a method of operating an AI system according to another embodiment of the present invention.

FIG. 9 is a ladder diagram illustrating a method of operating an AI system according to another embodiment of the present invention.

The AI system described with reference to FIG. 9 may include the robot 100a, the external robots and the AI server 200.

Referring to FIG. 9, the processor 180 of the robot 100a acquires situation information and position information of a user (S901).

In one embodiment, the situation information of the user may include one or more of voice information of a user or action information of the user.

The processor 180 may acquire the voice information of the user through the microphone 122.

The action information of the user may indicate which action the user is taking. For example, the action of the user may include an action to find the way, an action to view a guideboard, etc.

The processor 180 may capture an image through the camera 121 and acquire the action information of the user based on the captured information.

The processor 180 may determine the action of the user using an image recognition model.

The image recognition model may be an artificial neural network model learned using a deep learning algorithm or a machine learning algorithm.

The image recognition model may be learned through supervised learning.

The image recognition model may be received from the AI server 200 or may be learned by the learning processor 130 of the robot 100a.

The image recognition model may infer the action of the user using image data and a user action labeled with the image data as learning data.

In another example, the processor 180 may receive the action of the user from the AI server 200. In this case, the AI server 200 may receive the images of user from the cameras disposed at various places and determine the action of the user using the received images and the image recognition model.

The determined action of the user may be transmitted to the robot 100a.

The position information of the user may indicate an area, in which the user is located, in the entire area. The position information of the user may be received from the AI server 200.

The area, in which the user included in the position information of the user is located, may be different from the area in which the robot 100a is located.

The processor 180 determines whether the user needs guidance based on the situation information of the user (S903).

The processor 180 may analyze the voice information of the user and determine whether the user needs guidance according to the result of analysis.

For example, when the voice information of the user has an intention of asking the way, such as <Do you know how to get to a particular gate>, the processor 180 may determine that the user needs guidance.

The processor 180 may convert the voice information of the user into text information and analyze the intention of the converted text information using a natural language processing engine.

The processor 180 may determine the action of the user from the image acquired through the camera 121 based on the image recognition model.

The processor 180 may determine whether the determined action of the user corresponds to a situation requiring guidance.

The processor 180 may store action information related to situations requiring guidance in the memory 170. The action information may indicate that the action of the user is an action to find the way or an action to view a guideboard during a certain time.

For example, upon determining that the determined action of the user is an action to find the way or an action to view a guideboard during a certain time, the processor 180 may determine that the user needs guidance.

The processor 180 may give priority indicating the urgency of the guidance to the area in which the user is located, based on the situation information of the user.

Figure 10:
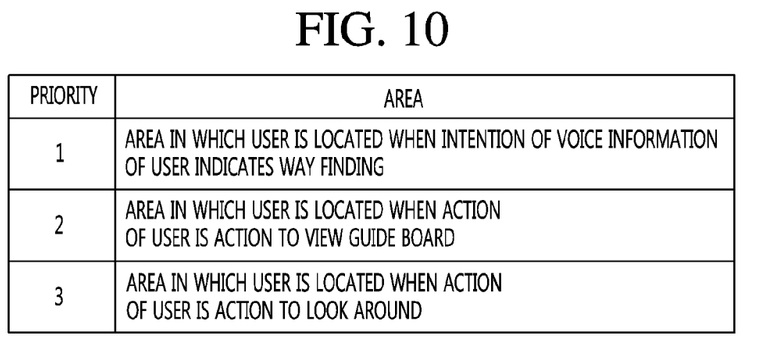
FIG. 10 is a view illustrating priorities given to a plurality of areas according to another embodiment of the present invention.

FIG. 10 is a view illustrating priorities given to a plurality of areas according to another embodiment of the present invention.

Referring to FIG. 10, when the voice information of the user has an intention of finding the way, the area in which the user is located may have first priority.

In addition, when the action of the user is an action to view the guideboard, the area in which the user is located may have second priority.

In addition, when the action of the user is an action to look around, the area in which the user is located may have third priority.

The processor 180 may determine the situation of the user from the situation information of the user and give priority to the position of the user corresponding to the determined situation.

The processor 180 may transmit, to an external robot, a command for moving the external robot to the position of the user corresponding to the situation of the user having highest priority.

FIG. 9 will be described again.

Upon determining that the user needs guidance, the processor 180 measures the distance between the robot 100a and each of the plurality of external robots (S905).

The method of measuring the distance may be replaced with the description of step S501 of FIG. 5.

The processor 180 determines whether the number of external robots within the certain distance is equal to or greater than a certain number, based on the measured distance (S907).

When the number of external robots within the certain distance is equal to or greater than the certain number, the processor 180 acquires the task status information of each external robot (S909).

The processor 180 determines whether an external robot which has completed a task thereof is present based on the acquired task status information (S911).

The description of the task status information is replaced with the description of step S505 of FIG. 5.

When the external robot which has completed the task thereof is present, the processor 180 transmits, to the external robot, a command for moving the external robot to an area corresponding to the acquired position information of the user (S913).

Since the user needs guidance, the processor 180 may transmit, to the external robot which has completed the task thereof, the command for moving the external robot to the area in which the user is located through the communication unit 110, in order to provide guidance to the user.

The external robot, which has received the command, may move to the area in which the user is located and output audio guidance corresponding to the intention of the voice uttered by the user.

In another example, the external robot may output voice asking about which way the user wants to find.

According to the embodiment, when robots are concentrated in one area and a user needs guidance in another area, a external robot may move to the area in which the user is located. Therefore, the user can rapidly obtain desired information.

In addition, it is possible to reduce congestion which may occur as robots are concentrated and to more efficiently perform the task of the robot.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the processor 180 of the artificial intelligence device.

The invention claimed is:

1. A robot for providing a guidance service using artificial intelligence, the robot comprising:
a communication unit; and
a processor configured to:
measure a distance between each of a plurality of external robots located in a first area and the robot,
determine a number of external robots for which the measured distance is within a certain distance, and
transmit, through the communication unit and to one or more external robots, a command for moving the one or more external robots among the plurality of external robots to a second area different from the first area based on the determined number of external robots within the certain distance of the robot being equal to or greater than a certain number,
wherein the processor acquires situation information of a user and position information of the user, and
wherein the processor transmits, through the communication unit and to the one or more external robots, the command for moving the one or more external robots to the second area corresponding to the acquired position information based on the acquired situation information indicating that the user needs guidance.

2. The robot according to claim 1, wherein the processor receives task status information from each of the plurality of external robots and transmits the command for moving an external robot which has completed a task thereof to the second area when the external robot which has completed the task thereof is present based on the received task status information.

3. The robot according to claim 2,
wherein the processor requests area information from an external server through the communication unit and receives the area information according to the request, and
wherein the area information includes positions of the plurality of areas and the number of robots respectively disposed in the plurality of areas.

4. The robot according to claim 3, wherein the processor determines, as the second area, an area in which the number of robots is smallest among the plurality of areas.

5. The robot according to claim 3, wherein the processor determines, as the second area, as an area in which a ratio of the number of robots to the number of users is largest among the plurality of areas.

6. The robot according to claim 1, further comprising a distance sensor configured to measure a time difference between a transmitted signal transmitted to an external robot and a response signal received in response to the transmitted signal through the communication unit,
wherein the processor measures the distance between each external robot and the robot based on the measured time difference.

7. The robot according to claim 1, further comprising a global positioning system (GPS) module,
wherein the processor acquires first position coordinates of the robot through the GPS module, receives second position coordinates from an external robot, and measures a distance between the first position coordinates and the second position coordinates as the distance between each external robot and the robot.

8. The robot according to claim 1, wherein the situation information includes one or more of voice information of the user or action information of the user.

9. The robot according to claim 8,
wherein the processor determines an action of the user from an acquired image using the image and an image recognition model and determines that the user needs the guidance when the determined action of the user is prestored, and
wherein the image recognition model is an artificial neural network model learned using a deep learning algorithm or a machine learning algorithm.

10. A method of operating a robot for providing a guidance service using artificial intelligence, the method comprising:
measuring a distance between each of a plurality of external robots located in a first area and the robot;
determining a number of external robots for which the measured distance is within a certain distance;
determining whether the number of external robots within the certain distance of the robot is equal to or greater than a certain number; and
transmitting, through the communication unit and to one or more external robots, a command for moving the one or more external robots among the plurality of external robots to a second area different from the first area based on the determined number of external robots being equal to or greater than the certain number,
wherein the method further comprises:
acquiring situation information of a user and position information of the user, and
transmitting, through the communication unit and to the one or more external robots, the command for moving the one or more external robots to the second area corresponding to the acquired position information based on the acquired situation information indicating that the user needs guidance.

11. The method according to claim 10, further comprising receiving task status information from each of the plurality of external robots,
wherein the transmitting includes transmitting the command for moving an external robot which has completed a task thereof to the second area, when the external robot which has completed the task thereof is present based on the received task status information.

12. The method according to claim 11, further comprising:
requesting area information from an external server; and
receiving the area information according to the request, and
wherein the area information includes positions of the plurality of areas and the number of robots respectively disposed in the plurality of areas.

13. The method according to claim 12, further comprising determining, as the second area, an area in which the number of robots is smallest among the plurality of areas.

14. The method according to claim 12, further comprising determining, as the second area, as an area in which a ratio of the number of robots to the number of users is largest among the plurality of areas.

* * * * *